US011870074B2

(12) United States Patent
Tanaami et al.

(10) Patent No.: US 11,870,074 B2
(45) Date of Patent: Jan. 9, 2024

(54) NON-AQUEOUS ELECTROLYTE SECONDARY BATTERY NEGATIVE ELECTRODE AND NON-AQUEOUS ELECTROLYTE SECONDARY BATTERY INCLUDING SAME

(71) Applicant: HONDA MOTOR CO., LTD., Tokyo (JP)

(72) Inventors: Kiyoshi Tanaami, Saitama (JP); Makiko Takahashi, Saitama (JP); Tomohiro Kinoshita, Saitama (JP); Shintaro Aoyagi, Saitama (JP); Yuji Isogai, Saitama (JP); Takashi Mukai, Osaka (JP); Yuta Ikeuchi, Osaka (JP); Taichi Sakamoto, Osaka (JP); Naoto Yamashita, Osaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 17/368,764

(22) Filed: Jul. 6, 2021

(65) Prior Publication Data
US 2022/0013783 A1 Jan. 13, 2022

(30) Foreign Application Priority Data
Jul. 9, 2020 (JP) .................................. 2020-118704

(51) Int. Cl.
*H01M 4/62* (2006.01)
*H01M 4/134* (2010.01)
(Continued)

(52) U.S. Cl.
CPC ........... *H01M 4/621* (2013.01); *H01M 4/134* (2013.01); *H01M 4/139* (2013.01); *H01M 4/381* (2013.01);
(Continued)

(58) Field of Classification Search
CPC ....... H01M 10/0525; H01M 2004/027; H01M 4/134; H01M 4/139; H01M 4/381; H01M 4/386; H01M 4/48; H01M 4/5825; H01M 4/621; H01M 4/624; H01M 4/80; Y02E 60/10
See application file for complete search history.

(56) References Cited

U.S. PATENT DOCUMENTS

2019/0326601 A1   10/2019   Sakamoto et al.
2021/0313574 A1   10/2021   Tanaami et al.

FOREIGN PATENT DOCUMENTS

JP     2003308831 A    10/2003
JP     2012033280 A     2/2012
(Continued)

*Primary Examiner* — Victoria H Lynch
(74) *Attorney, Agent, or Firm* — CKC & Partners Co., LLC

(57) ABSTRACT

An object is to provide a non-aqueous electrolyte secondary battery negative electrode that can suppress a deterioration in durability and improve energy density, and a non-aqueous electrolyte secondary battery including the same. A non-aqueous electrolyte secondary battery negative electrode, comprising: a collector formed of a porous metal body, and a negative electrode material disposed in pores of the porous metal body, wherein the negative electrode material comprises a negative electrode active material formed of a silicon-based material, a skeleton-forming agent comprising a silicate having a siloxane bond, a conductivity aid, and a binder.

4 Claims, 4 Drawing Sheets

(51) Int. Cl.
*H01M 4/139* (2010.01)
*H01M 4/38* (2006.01)
*H01M 10/0525* (2010.01)
*H01M 4/02* (2006.01)

(52) U.S. Cl.
CPC ....... *H01M 4/386* (2013.01); *H01M 10/0525* (2013.01); *H01M 2004/027* (2013.01)

(56) References Cited

FOREIGN PATENT DOCUMENTS

| | | | |
|---|---|---|---|
| JP | 2016115598 | A | 6/2016 |
| JP | 6149147 | B1 | 6/2017 |
| JP | 2018085276 | A | 5/2018 |
| JP | 6369818 | B2 | 8/2018 |
| JP | 2019212638 | A | 12/2019 |
| WO | 2018096702 | A1 | 5/2018 |
| WO | 2019230322 | A1 | 12/2019 |

NON-AQUEOUS ELECTROLYTE SECONDARY BATTERY NEGATIVE ELECTRODE AND NON-AQUEOUS ELECTROLYTE SECONDARY BATTERY INCLUDING SAME

This application is based on and claims the benefit of priority from Japanese Patent Application No. 2020-118704, filed on 9 Jul. 2020, the content of which is incorporated herein by reference.

BACKGROUND OF THE INVENTION

Field of the Invention

The present invention relates to a non-aqueous electrolyte secondary battery negative electrode and a non-aqueous electrolyte secondary battery including the same.

Related Art

In recent years, since non-aqueous electrolyte secondary batteries such as a lithium-ion secondary battery have been small and lightweight and have produced a high output, they have been increasingly used for automobiles and the like. The non-aqueous electrolyte secondary battery is a generic name for a battery system that uses, as its electrolyte, an electrolyte whose main component is not water and an electricity storage device that can be charged and discharged. For example, a lithium-ion battery, a lithium-polymer battery, a lithium all-solid-state battery, a lithium-air battery, a lithium-sulfur battery, a sodium-ion battery, a potassium-ion battery, a polyvalent ion battery, a fluoride battery, a sodium-sulfur battery and the like are known. The non-aqueous electrolyte secondary battery is mainly formed with a positive electrode, a negative electrode and an electrolyte. When the electrolyte has fluidity, a separator is further interposed between the positive electrode and the negative electrode.

For example, for the purpose of improving battery life, a technology is disclosed in which a skeleton-forming agent including a silicate having a siloxane bond is made to exist on at least the surface of an active material and in which the skeleton-forming agent is made to penetrate from the surface thereinto (see, for example, Patent Document 1). It is disclosed that, with this technology, a strong skeleton can be formed in the active material so as to improve the battery life. A technology is also disclosed in which the skeleton-forming agent described above is, applied to a negative electrode including a silicon (Si)-based active material. (see, for example, Patent Document 2).

Patent Document 1: Japanese Patent No. 6369818
Patent Document 2: Japanese Patent No. 6149147

SUMMARY OF THE INVENTION

Incidentally, in the non-aqueous electrolyte secondary battery described above, its energy density is required to be improved. In order to improve the energy density, it is considered effective to increase the film thickness of a negative electrode and to increase the density of the negative electrode active material. However, in the prior art techniques, there is a limit to increasing the thickness of negative electrode in terms of manufacture of negative electrodes. Specifically, as shown in FIG. 5, when a mixture layer is applied to a conventional a collector foil, a practical thickness is less than 100 μm. At a film thickness of 100 μm or more, problems such as coating unevenness, cracking, and peeling occur, and it is difficult to manufacture a negative electrode with high accuracy.

Further, in order to ensure a good balance between binding force of a binder, and expansion and contraction of a negative electrode active material, there is a limit to the amount of the negative electrode active material per unit area, from the viewpoint of durability. Specifically, as shown in FIG. 6, there is a significant difference in durability between 3.76 mAh/cm$^2$ and 4.91 mAh/cm$^2$, the active material capacity of a negative electrode per unit area is limited to about 4 mAh/cm$^2$ (film thickness 50 μm), and above this, a satisfactory cyclicity cannot be ensured. On the other hand, when the active material capacity is lower than 4 mAh/cm$^2$, an improvement in energy density cannot be expected.

Therefore, a non-aqueous electrolyte secondary battery negative electrode that can suppress a deterioration in durability and that can also improve energy density, and a non-aqueous electrolyte secondary battery provided with this are desired.

The present invention is made in view of the situation described above, and an object thereof is to provide a non-aqueous electrolyte secondary battery negative electrode capable of suppressing a deterioration in durability and improving energy density, and a non-aqueous electrolyte secondary battery including the same.

(1) In order to achieve the above object, the present invention provides a non-aqueous electrolyte secondary battery negative electrode, including: a collector formed of a porous metal body and a negative electrode material disposed in pores of the porous metal body, wherein the negative electrode material includes a negative electrode active material formed of a silicon-based material, a skeleton-forming agent containing a silicate having a siloxane bond, a conductivity aid, and a binder.

(2) In the non-aqueous electrolyte secondary battery negative electrode of (1), the skeleton-forming agent may include a silicate represented by general formula (1) below.

[Chem. 1]

$$A_2O \cdot nSiO_2 \qquad \text{formula (1)}$$

[In the general formula (1) above, A represents an alkali metal.]

(3) In the non-aqueous electrolyte secondary battery negative electrode as described in (1) or (2), the thickness of the aforementioned non-aqueous electrolyte secondary battery negative electrode may be 50 μm to 1,000 μm.

(4) In the non-aqueous electrolyte secondary battery negative electrode as described in any one of (1) to (3), an, average pore diameter of the porous metal body may be 500 μm or less.

(0.5) In the non-aqueous electrolyte secondary battery negative electrode as described in any one of (1) to (4), a distance between the porous metal body and the negative electrode active material may be 50 μm or less.

(6) In the non-aqueous electrolyte secondary battery negative electrode as described in any one of (1) to (5), the porous metal body may be a foamed metal body.

(7) Further, the present invention provides a non-aqueous electrolyte secondary battery including the non-aqueous electrolyte secondary battery negative electrode as described in any one of (1) to (6).

According to the present invention, it is possible to provide a non-aqueous electrolyte secondary battery negative electrode capable of suppressing a deterioration in durability and improving energy density, and a non-aqueous electrolyte secondary battery including the same.

DETAILED DESCRIPTION OF THE INVENTION

Hereinafter, embodiments of the present invention will be described in detail with reference to the accompanying drawings.

[Negative Electrode]

Figure 1:
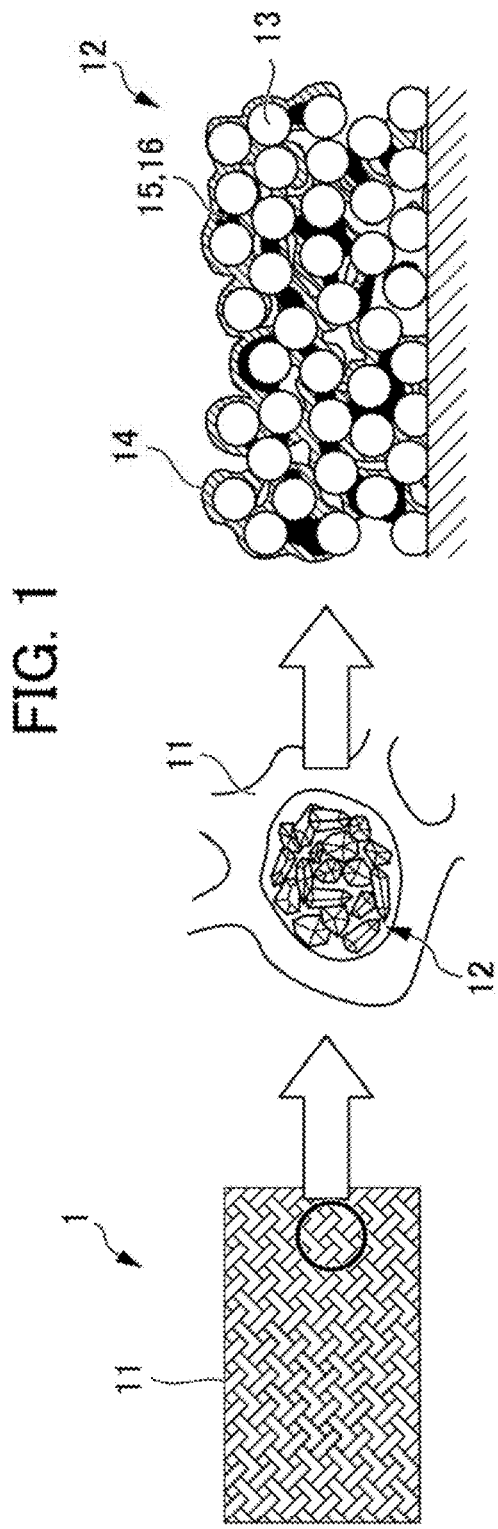
FIG. 1 is a diagram schematically showing the configuration of a non-aqueous electrolyte secondary battery negative electrode according to an embodiment of the present invention.

FIG. 1 is a diagram schematically showing the configuration of a non-aqueous electrolyte secondary battery negative electrode 1 according to an embodiment of the present invention. The non-aqueous electrolyte secondary battery negative electrode 1 as described in the present embodiment has a collector 11 formed of a porous metal body and a negative electrode material 12 disposed in pores of the porous metal body. Further, the negative electrode material 12 includes a negative electrode active material 13 formed of a silicon-based material, a skeleton-forming agent 14 containing a silicate having a siloxane bond, a conductivity aid 15, and a binder 16. For example, by applying the present embodiment to a lithium-ion secondary battery negative electrode, it is possible to provide a lithium-ion secondary battery negative electrode capable of suppressing a deterioration in durability and improving energy density, and a lithium-ion secondary battery including the same. Although an example where the present embodiment is applied to a lithium-ion secondary battery negative electrode will be described in detail below, various additions, modifications or deletions can be made without departing from the spirit of the present invention.

As the collector 11, a collector 11 formed of a porous metal body is used. Examples thereof include a mesh, a woven fabric, a non-woven fabric, an embossed body, a punched body, an expanded body, a foamed body and the like, and a foamed metal body is preferably used. Among them, a foamed metal body with a three-dimensional network structure having continuous pores is preferably used, and for example, Celmet (registered trademark) (manufactured by Sumitomo Electric Industries, Ltd.) or the like can be used.

A material for the porous metal body is not particularly limited, as long as it has electron conductivity and is a material that can conduct electricity through the electrode material supported, and for example, a conductive metal, such as Al, an Al alloy, Ni, Fe, Cu, Ti, Cr, Au, Mo, W, Ta, Pt, Ru, Rh, etc., and a conductive alloy (stainless steel (SUS304, SUS316, SUS316L, YUS270, etc.) containing two or more of these conductive metals can be used. Further, when using a material other than the above-mentioned conductive metals or conductive alloys, the material may have a multilayer structure formed of dissimilar metals such as Fe coated with Cu or Ni. Among them, for reasons of excellent electron conductivity and reduction resistance, Ni or a Ni alloy is preferably used.

The thickness of the porous metal body is preferably 10 μm or more, and more preferably 50 μm or more. The thickness of the porous metal body is preferably 1 mm or less, and more preferably 500 μm or less.

The average pore diameter of the porous metal body is preferably 500 μm or less. When the average pore diameter of the porous metal body is within this range, a distance between the negative electrode active material 13 filled in the inside of the porous metal body and a metal skeleton is stabilized, and the electron conductivity is improved, thereby suppressing an increase in the internal resistance of the battery. Further, even if a volume change accompanied by charging and discharging occurs, it is possible to suppress the electrode material mixture from falling off.

The specific surface area of the porous metal body is preferably between 1,000 and 10,000 $m^2/m^3$. This is 2 to 10 times a specific surface area of conventionally common collector foils. When the specific surface area of the porous metal body is within this range, contact between the electrode material mixture and the collector 11 is improved, and an increase in the internal resistance of the battery is suppressed. A more preferred specific surface area is 4,000 to 7,000 $m^2/m^3$.

The porosity of the porous metal body is preferably from 90 to 99%. When the porosity of the porous metal body is within this range, it is possible to increase a filling amount of the electrode material mixture, thereby improving the energy density of the battery. Specifically, when the porosity is more than 99%, a mechanical strength of the porous metal body significantly decreases, and is easily broken due to volume change in the electrode during charging and discharging. On the contrary, when the filling amount is less than 90%, not only is the filling amount of electrode material mixture small, but also ionic conductivity of the electrode decreases, and it is difficult to obtain sufficient input/output characteristics. From these viewpoints, a more preferred porosity is 93 to 98%.

The electrode basis weight of the porous metal body is preferably 1 to 100 $mg/cm^2$. When the electrode basis weight of the porous metal body to an electrode is within this range, active material capacity can be sufficiently exerted, and it is possible to exhibit a capacity as designed as an electrode. A more preferred electrode basis weight to an electrode is 5 to 60 $mg/cm^2$.

As the negative electrode active material 13, a material capable of reversibly storing and releasing lithium ions is used, and specifically, a negative electrode active material 13 formed of a silicon-based material having a high capacity is used. As the silicon-based material, elemental silicon, a silicon alloy, a silicon oxide, a silicon compound and the like apply. Here, the elemental silicon refers to crystalline or amorphous silicon whose purity is equal to or greater than 95% by mass. The silicon alloy means a Si-M alloy formed of silicon and another transition element M, examples, of M include Al, Mg, La, Ag, Sn, Ti, Y, Cr, Ni, Zr, V, Nb, Mo and the like, and the silicon alloy may be an all-proportional solid solution alloy, a eutectic alloy, a hypoeutectic alloy, a hypereutectic alloy or a peritectic alloy. The silicon oxide means an oxide of silicon or a complex formed of elemental silicon and $SiO_2$, and in the elemental ratio of Si and O, O is preferably equal to or less than 1.7 with the assumption that Si is 1. The silicon compound refers to a substance in which silicon and two or more types of other elements are chemically bonded together. Among them, the elemental silicon is preferable because an interface layer which will be described later can be satisfactorily formed. Alternatively, a material obtained by mixing or compounding a carbon-based material with the silicon-based material can be used.

The shape of the silicon-based material is not particularly limited, the silicon-based material may be spherical, oval, faceted, band-shaped, fibrous, flaky, donut-shaped or hollow powder, and the silicon-based material may be formed with single particles or granules.

The negative electrode active material 13 formed of the silicon-based material has an expansion ratio of 10% or more due to charging and discharging. In other words, although the negative electrode active material 13 significantly expands and contracts during charging and discharging, by using the skeleton-forming agent 14 described below, it is possible to suppress a deterioration in durability due to such expansion and contraction.

From the viewpoint of excellent cycle characteristics of the electrode and being capable of obtaining high input/output characteristics, a particle diameter of the silicon-based material is preferably 0.01 μm to 10 μm.

In addition to the silicon-based material described above, the negative electrode active material 13 may include a carbon-based material (graphite, hard carbon, soft carbon, or the like).

As the skeleton-forming agent 14, a skeleton-forming agent 14 including a silicate having a siloxane bond is used. More specifically, the skeleton-forming agent 14 preferably includes a silicate represented by general formula (1) below.

[Chem. 2]

$$A_2O.nSiO_2 \qquad \text{formula (1)}$$

In general formula (1) above, A represents an alkali metal. In particular, at least one of lithium (Li), sodium (Na) and potassium (K) is preferable as A. As the skeleton-forming agent, the alkali metal salt of a silicate having a siloxane bond as described above is used, and thus a lithium-ion secondary battery which has a high strength, excellent heat resistance and an excellent cycle life is obtained.

In general formula (1) above, n is preferably equal to or greater than 1.6 and equal to or less than 3.9. In a case where n is within the range described above, when the skeleton-forming agent 14 is mixed with water to form a skeleton-forming agent liquid, moderate viscosity is obtained, and when it is applied as the negative electrode active material 13 to the negative electrode including silicon as will be described later, the skeleton-forming agent 14 easily penetrates into the negative electrode 12. Hence, the lithium-ion secondary battery which has a high strength, excellent heat resistance and an excellent cycle life can be more reliably obtained. More preferably, n is equal to or greater than 2.0 and equal to or less than 3.5.

The silicate described above is preferably amorphous. The amorphous silicate has a disordered molecular arrangement so as not to crack in a specific direction like a crystal. Hence, the amorphous silicate is used as the skeleton-forming agent 14, and thus the cycle life characteristics are improved.

For example, the skeleton-forming agent liquid described above is applied as the negative electrode active material 13 to the negative electrode including silicon, and thus the skeleton-forming agent 14 penetrates between the negative electrode active materials 13. Then, it is inferred that silicon forming the negative electrode active material 13 and the silicate forming the skeleton-forming agent 14 are fused together, for example, the hydrolyzed silicate is heated to undergo a hydration reaction (condensation reaction of silanol groups) so as to form a siloxane bond (—Si—O—Si). In other words, in a lithium-ion secondary battery negative electrode 1 of the present embodiment, at the interface between the negative electrode active material 13 and the skeleton-forming agent 14, an interface layer formed of inorganic substances is formed, and the interface layer includes silicon derived from the siloxane bond and an alkali metal generated, for example, by hydrolysis of the silicate. Then, it is inferred that, by the existence of the interface layer, the negative electrode active material 13 and the skeleton-forming agent 14 are firmly bonded together, and consequently, excellent cycle life characteristics are obtained.

In the present embodiment, the ratio of the alkali metal atoms to all the constituent atoms of the interface layer is preferably higher than the ratio of the alkali metal atoms to all the constituent atoms of the skeleton-forming agent 14. More specifically, the ratio of the alkali metal atoms to all the constituent atoms of the interface layer is preferably five or more times as high as the ratio of the alkali metal atoms to all the constituent atoms of the skeleton-forming agent 14. In this way, the negative electrode active material 13 and the skeleton-forming agent 14 are more firmly bonded together, and thus peeling caused by the expansion and contraction of the negative electrode active material 13 during charging and discharging and the occurrence of a wrinkle or a crack of the collector 11 are more satisfactorily suppressed, thereby further enhancing the cycle life.

The thickness of the interface layer described above is preferably 0.3 to 30 nm. When the thickness of the interface layer is within this range, the negative electrode active material 13 and the skeleton-forming agent 14 are more firmly bonded together, and thus peeling caused by the expansion and contraction of the negative electrode active material 13 during charging and discharging and the occurrence of a wrinkle or a crack of the collector 11 are more satisfactorily suppressed, thereby further enhancing the cycle life.

The skeleton-forming agent 14 of the present embodiment may include a surfactant. In this way, the lyophilic property of the skeleton-forming agent. 14 into the negative electrode material 12 is improved, and thus the skeleton-forming agent 14 uniformly penetrates into the negative electrode material 12. Hence, a uniform skeleton is formed between the negative electrode active materials 13 within the negative electrode material 12, and thus the cycle life characteristics are further improved.

A content (density) of the skeleton-forming agent 14 in the negative electrode material 12 is preferably 0.1 to 5.0 $mg/cm^2$. The content of the skeleton-forming agent 14 in the negative electrode material 12 is within this range, and thus the effects produced by the use of the skeleton-forming agent 14 described above are more reliably achieved.

When the total solid content of the negative electrode active material 13, the skeleton-forming agent 14, the conductivity aid 15, and the binder 16 is assumed to be 100% by mass, the content of the skeleton-forming agent 14 is preferably 3.0 to 40.0% by mass. The content of the skeleton-forming agent 14 is within this range, and thus the effects produced by the use of the skeleton-forming agent 14 described above are more reliably achieved. The content of the skeleton-forming agent 14 in the negative electrode material 12 is set equal to or greater than 3.0% by mass, and thus the function of the skeleton-forming agent 14 is more sufficiently obtained. The content of the skeleton-forming agent 14 is set equal to or less than 40.0% by mass, and thus it is possible to more satisfactorily prevent a decrease in energy density. The content of the skeleton-forming agent 14 is more preferably 5.0 to 30.0% by mass.

Herein, in the non-aqueous electrolyte secondary battery negative electrode 1 of the present embodiment, the skeleton-forming agent 14 is disposed at least at the interface with the collector 11 in the negative electrode material 12. More specifically, the skeleton-forming agent 14 is disposed not only at the interface between the collector 11 and the negative electrode material 12 but also uniformly in the entire negative electrode material 12, and thus the skeleton-forming agent 14 exists between the negative electrode active materials 13 in a state of being dispersed. By contrast, in a conventional non-aqueous electrolyte secondary battery negative electrode, the skeleton-forming agent is unevenly distributed on the surface of the negative electrode material.

The lithium-ion secondary battery negative electrode 1 according to the present embodiment includes the conductivity aid 15. The conductivity aid 15 is not particularly limited as long as the conductivity aid has electron conductivity, and a metal, a carbon material, a conductive polymer, conductive glass and the like can be used. Specific examples thereof include acetylene black (AB), ketjen black (KB), furnace black (FB), thermal black, lamp black, channel black, roller black, disc black, carbon black (CB), carbon fiber (for example, vapor growth carbon fiber VGCF (registered trademark)), carbon nanotube (CNT), carbon nanohorn, graphite, graphene, glassy carbon, amorphous carbon end the like, and one or two or more types thereof can be used.

When the total of the negative electrode active material 13, the conductivity aid 15, and the binder 16 contained in the negative electrode material 12 is assumed to be 100% by mass, a content of the conductivity aid 15 is preferably 0 to 20.0% by mass. The content of the conductivity aid 15 is within this range, and thus conductivity can be improved without a negative electrode capacity density being lowered, and air gaps can be formed to keep a sufficient amount of the skeleton-forming agent 14 within the negative electrode material 12. The content of the conductivity aid 15 is more preferably 8.8 to 25.0% by mass.

The bulk density of the conductivity aid 15 of the present embodiment is preferably 0.04 to 0.25 mg/cm$^3$. The bulk density of the conductivity aid 15 is within this range, and thus the impregnation can be sufficiently performed with the skeleton-forming agent 14 described above, with the result that the above-described effects produced by the skeleton-forming agent 14 can be sufficiently achieved. The bulk density of the conductivity aid 15 is more preferably 0.04 to 0.15 mg/cm.

The lithium-ion secondary battery negative electrode 1 according to the present embodiment includes the binder 16. As the binder 16, for example, one type of organic material such as polyvinylidene difluoride (PVdF), polytetrafluoroethylene (PTFE), polyimide (PI), polyamide, polyamide imide, aramid, polymer containing acryl groups, styrene butadiene rubber (SBR), ethylene-vinyl acetate copolymer (EVA), styrene-ethylene-butylene-styrene copolymer (SEBS), carboxymethyl cellulose (CMC), xanthan gum, polyvinyl alcohol (PVA), ethylene vinyl alcohol, polyvinyl butyral (PVB), polyethylene (PE), polypropylene (PP), polyacrylic acid, lithium polyacrylate, sodium polyacrylate, potassium polyacrylate, ammonium polyacrylate, methyl polyacrylate, ethyl polyacrylate, amine polyacrylate, polyacrylic acid esters, epoxy resins, polyethylene terephthalate (PET), polybutylene terephthalate (PBT), nylon, vinyl chloride, silicone rubber, nitrile rubber, cyanoacrylate, urea resins, melamine resins, phenol resins, latex, polyurethane, silylated urethane, nitrocellulose, dextrin, polyvinylpyrrolidone, vinyl acetate, polystyrene, chloropropylene, resorcinol resin, polyaromatic, modified silicone, methacrylic resin, polybutene, butyl rubber, 2-propenoic acid, cyanoacrylic acid, methyl methacrylate, glycidyl methacrylate, acrylic oligomer, 2-hydroxyethyl acrylate, alginic acid, starch, lacquer, sucrose, glue, casein and cellulose nanofibers may be used singly or two or more types thereof may be used together.

Binders obtained by mixing various types of organic binders described above and inorganic binders may be used. As the inorganic binder, silicate-based, phosphate-based, sol-based, cement-based binders and the like are mentioned. For example, one type of inorganic material such as lithium silicate, sodium silicate, potassium silicate, cesium silicate, guanidine silicate, ammonium silicate, fluosilicic salt, borate, lithium aluminate, sodium aluminate, potassium aluminate, aluminosilicate, lithium aluminate, sodium aluminate, potassium aluminate, polyaluminum chloride, aluminum-polysulfate, aluminum silicate polysulfate, aluminum sulfate, aluminum nitrate, ammonium alum, lithium alum, sodium alum, potassium alum, chrome alum, iron alum, manganese alum, nickel ammonium sulfate, diatomaceous soil, polyzirconoxane, polytantaroxane, mullite, white carbon, silica sol, colloidal silica, fumed silica, alumina sol, colloidal alumina, fumed alumina, zirconia sol, colloidal zirconia, fumed zirconia, magnesia sol, colloidal magnesia, fumed magnesia, calcia sol, colloidal calcia, fumed calcia, titania sol, colloidal titania, fumed titania, zeolite, silicoaluminophosphate zeolite, sepiolite, montmorillonite, kaolin, saponite, aluminum phosphate, magnesium phosphate, calcium phosphate, iron phosphate, copper phosphate, zinc phosphate, titanium phosphate, manganese phosphate, barium phosphate, tin phosphate, low melting point glass, mortar, gypsum, magnesium cement, litharge cement, portland cement, blast furnace cement, fly ash cement, silica cement, phosphate cement, concrete and solid electrolytes may be used singly or two or more types thereof may be used together.

In the present embodiment, with the interface layer formed by the use of the skeleton-forming agent 14, the negative electrode active material 13 and the skeleton-forming agent 14 are firmly bonded together, and thus all the binders 16 described above can be used. When the total of the negative electrode active material 13, the conductivity aid 15, and the binder 16 contained in the negative electrode material 12 is assumed to be 100% by mass, a content of the binder 16 is preferably 0.1 to 60% by mass. The content of the binder 16 is within this range, and thus ion conductivity can be improved without the negative electrode capacity density being lowered, and a high mechanical strength and excellent cycle life characteristics are obtained. The content of the binder 16 is more preferably 0.5 to 30% by mass.

The non-aqueous electrolyte secondary battery negative electrode 1 of the present embodiment including the above configuration preferably has a thickness of 50 μm to 1,000 μm. When the non-aqueous electrolyte secondary battery negative electrode 1 has a thickness within this range, a deterioration in durability can be more satisfactorily suppressed and the energy density can be improved, as compared with conventional ones. The non-aqueous electrolyte secondary battery negative electrode 1 more preferably has a thickness of 150 μm to 8.00 μm.

In addition, in the non-aqueous electrolyte secondary battery negative electrode 1 of the present embodiment, a distance between the collector 11 formed of a porous metal body and the negative electrode active material 13 is preferably 50 μm or less. When the distance between the collector 11 formed of a porous metal body and the negative electrode active material 13 is 50 μm or less, a deterioration in durability can be suppressed. The distance between the collector 11 formed of a porous metal body and the negative electrode active material 13 is more preferably 3.0 μm or less.

[Positive Electrode]

A positive electrode when the lithium-ion secondary battery is formed with the negative electrode described above will now be described. A positive electrode active material is not particularly limited as long as the positive electrode active material is normally used in a lithium-ion secondary battery. For example, positive electrode active materials such as alkali metal transition metal oxide-based, vanadium-based, sulfur-based, solid solution-based (lithium excess-based, sodium excess-based and potassium excess-based), carbon-based and organic substance-based positive electrode active materials are used.

As with the negative electrode described above, the lithium-ion secondary battery positive electrode of the present embodiment may include a skeleton-forming agent. As the skeleton-forming agent, the same skeleton-forming agent as used in the negative electrode described above can be used, and a preferred content of the skeleton-forming agent is the same as in the negative electrode.

The lithium-ion secondary battery positive electrode of the present embodiment may include a conductivity aid. As the conductivity aid, the above-described various types of conductivity aids which can be used in the negative electrode are used. A preferred content of the conductivity aid is the same, as in the negative electrode.

The lithium-ion secondary battery positive electrode of the present embodiment may include a binder. As the binder, for example, one type of organic material such as polyvinylidene difluoride (PVdF), polytetrafluoroethylene (PTFE), hexafluoropropylene, tetrafluoroethylene, polymer containing acryl groups and alginic acid may be used singly or two or more types thereof may be used together. Binders obtained by mixing these organic binders and inorganic binders may be used. As the inorganic binder, for example, silicate-based, phosphate-based, sol-based, cement-based binders and the like are mentioned.

A collector used in the positive electrode is not particularly limited as long as the collector has electron conductivity and is a material capable of conducting electricity through a positive electrode active material which is held. For example, conductive substances such as C, Ti, Cr, Ni, Cu, Mo, Ru, Rh, Ta, W, Os, Ir, Pt, Au and Al and alloys (for example, stainless steel and an Al—Fe alloy) containing two or more types of these conductive substances can be used. When a substance other than the conductive substances described above is used, for example, a multilayer structure formed of metals of different species such as iron coated with Al or a multilayer structure formed of elements of different species such as Al coated with C may be used. In terms of high electrical conductivity and high stability in an electrolytic solution, C, Ti, Cr, Au, Al, stainless steel and the like are preferable as the collector, and furthermore, in terms of oxidation resistance and the material costs, C, Al, stainless steel and the like are preferable. Al coated with carbon or an Al alloy and stainless steel coated with carbon are more preferable.

Examples of the shape of the collector used in the positive electrode include a linear shape, a rod shape, a plate shape, a foil shape and a porous shape, and, among them, since a filling density can be increased and the skeleton-forming agent easily penetrates into the active material layer, the collector may have a porous shape. Examples of the porous shape include a mesh, a woven fabric, a non-woven fabric, an embossed body, a punched body, an expanded body, a foamed body and the like. The same porous metal body as in the negative electrode may be used.

[Separator]

In the lithium-ion secondary battery of the present embodiment, as a separator, a separator which is normally used in a lithium-ion secondary battery can be used. For example, as the separator, a polyethylene microporous membrane, a polypropylene microporous membrane, a glass non-woven fabric, an aramid non-woven fabric, a polyimide microporous membrane, a polyolefin microporous membrane and the like can be used.

[Electrolyte]

In the lithium-ion secondary battery of the present embodiment, as the electrolyte, an electrolyte which is normally used in a lithium-ion secondary battery can be used. For example, an electrolytic solution in which an electrolyte is dissolved in a solvent, a gel electrolyte, a solid electrolyte, an ionic liquid, a molten salt and the like are mentioned. Here, the electrolytic solution refers to a liquid in a state where an electrolyte is dissolved in a solvent.

As an electrolyte in a lithium-ion secondary battery, the electrolyte needs to contain lithium ions as a carrier responsible for electrical conductivity, and thus as the electrolyte salt thereof, a lithium salt is preferable though the electrolyte salt is not particularly limited as long as it is used in a lithium-ion secondary battery. As the lithium salt, at least one or more types selected from the group consisting of lithium hexafluorophosphate (LiPF$_6$), lithium perchlorate (LiClO$_4$), lithium tetrafluoroborate (LiBF$_4$), lithium trifluoromethanesulfonate (LiCF$_3$SO$_4$), lithium bistrifluoromethanesulfonylimide (LiN(SO$_2$CF$_3$)$_2$), lithium bispentafluoroethanesulfonylimide (LiN(SO$_2$C$_2$F$_5$)$_2$), lithium bisoxalate borate (LiBC$_4$O$_8$) and the like can be used or two or more types can be used together.

Although the solvent of the electrolyte is not particularly limited as long as the solvent is used in a lithium-ion secondary battery, at least one type selected from the group consisting of propylene carbonate (PC), ethylene carbonate (EC), dimethyl carbonate (DMC), diethyl carbonate (DEC), ethyl methyl carbonate (EMC), γ-butyrolactone (GBL), methyl-γ-butyrolactone, dimethoxymethane (DMM), dimethoxyethane (DME), vinylene carbonate (VC), vinylethylene carbonate (EVC), fluoroethylene carbonate (FEC), ethylenesulfite (ES) and the like can be used or two or more types can be used together.

Although the concentration of the electrolytic solution (concentration of a salt in the solvent) is not particularly limited, the concentration is preferably 0.1 to 3.0 mol/L and further preferably 0.8 to 2.0 mol/L.

The types of cations (positive ions) in an ionic liquid and a molten salt are categorized as pyridine-based, alicyclic amine-based, aliphatic amine-based cations and the like. The types of anions (negative ions) which are combined with those described above are selected, and thus various ionic liquids and molten salts can be synthesized. Examples of the cation include ammonium-based ions such as imidazolium salts and pyridinium salts, phosphonium-based ions, inorganic-based ions and the like, and examples of the anion adopted include halogen-based ions such as a bromide ion and triflate, boron-based ions such as tetraphenylborate, phosphorus-based ions such as hexafluorophosphate and the like.

The ionic liquid and the molten salt can be obtained by a known synthesis method of combining, for example, a cation such as imidazolinium and an anion such as $Br^-$, $BF^{4-}$, $PF^{6-}$, $(CF_3SO_2)_2N^-$, $CF_3SO^{3-}$ or $FeCl^{4-}$. When the ionic liquid or the molten salt is used, it can function as an electrolytic solution without addition of an electrolyte.

Solid electrolytes are categorized as sulfide-based, oxide-based, hydride-based, organic polymer-based electrolytes and the like. Most of these are amorphous or crystalline materials formed of a salt serving as a carrier and an inorganic derivative. Unlike an electrolytic solution, it is not necessary to use a flammable aprotic organic solvent, and thus the ignition of a gas or liquid, the leakage of a liquid and the like are unlikely to occur, with the result that it is expected that a significantly safe secondary battery is provided.

[Manufacturing Method]

A method for manufacturing a lithium-ion secondary battery according to the present embodiment will now be described. The method for manufacturing the lithium-ion secondary battery negative electrode according to the present embodiment includes a first step of applying, on a collector, a negative electrode material including a negative electrode active material, a conductivity aid and a binder and drying the negative electrode material so as to form a negative electrode layer precursor. For example, while a 1,000 μm thick nickel porous material is manufactured and the nickel porous body which is wound in a roll shape in advance is prepared, as the negative electrode material, a negative electrode active material, a binder, a conductivity aid and the like are mixed together to prepare a slurry in a paste form. Then, the negative electrode material in a slurry form is filled and applied into the inside of the nickel porous body and is dried, and thereafter pressure adjustment treatment is performed to obtain a negative electrode layer precursor.

As described above, the negative electrode layer precursor may be in a wet state without being dried. Additionally, methods, in which in addition to the slurry application described above, by using, for example, a chemical plating method, a sputtering method, a vapor deposition method, a gas deposition method, a dipping method, an injection method, or the like, the negative electrode active material (precursor) is applied so as to integrally form the negative electrode active material layer in the inside of the collector are mentioned. However, in terms of the lyophilic property of the skeleton-forming agent and electrode manufacturing costs, the slurry-filling and application method or the dipping method is preferable.

The method for manufacturing a lithium-ion secondary battery negative electrode according to the present embodiment also includes a second step of impregnating the negative electrode layer precursor formed in the first step with a skeleton-forming agent including a silicate having a siloxene bond or a phosphate having a phosphate bond and drying the negative electrode layer precursor to form the negative electrode layer. For example, a silicate having a siloxane bond or a phosphate having a phosphate bond is purified by a dry or wet method and is subjected to water adjustment sous to prepare a skeleton-forming agent liquid including the skeleton-forming agent. Here, a surfactant may be mixed. As the dry method, for example, $SiO_2$ is added into water in which an alkali metal hydroxide is dissolved and is treated in an autoclave at 150 to 250° C., and thus it is possible to manufacture an alkali metal silicate. As the wet method, for example, a mixture of an alkali metal carbonate compound and $SiO_2$ is burned at 1,000 to 2,000° C. and is dissolved in hot water, and thus it is possible to manufacture an alkali metal silicate.

Then, the skeleton-forming agent liquid is applied to the surface of the negative electrode layer precursor so as to; coat the negative electrode active material. As a method for applying the skeleton-forming agent, in addition to a method including immersing the precursor of the negative electrode in a chamber in which the skeleton-forming agent liquid is stored, a method including dropping and applying the skeleton-forming agent on the surface of the precursor of the negative electrode, spray application, screen printing, a curtain method, spin coating, gravure coating, die coating and the like can be used. The skeleton-forming agent applied to the surface of the negative electrode layer precursor penetrates into the inside of the negative electrode so as to enter the gaps and the like between the negative electrode active materials or those between the conductivity aids. Then, the skeleton-forming agent is dried by heat treatment so as to be cured. In this way, the skeleton-forming agent forms the skeleton of the negative electrode active material layer.

Since in the heat treatment described above, as its temperature is increased, the time of the heat treatment can be reduced and the strength of the skeleton-forming agent is improved, the temperature is preferably equal to or greater than 80° C., more preferably equal to or greater than 100° C. and desirably equal to or greater than 110° C. The upper limit temperature of the heat treatment is not particularly limited as long as the collector is not melted, and, for example, the temperature may be increased to about 1,000° C., which is the melting point of copper. In a conventional electrode the binder may be charred or the collector may be softened, and thus the upper limit temperature is estimated to be considerably lower than 1,000° C., however, in the present embodiment, the skeleton-forming agent is used, and the skeleton-forming agent has excellent heat resistance and has a higher strength than the collector, with the result that the upper limit of the temperature is 1,000° C.

With respect to the time of the heat treatment, the heat treatment can be performed by being held for 0.5 to 100 hours. Although the heat treatment may be performed in the atmosphere, the heat treatment is preferably performed under a non-oxidizing atmosphere so as to prevent oxidation of the collector.

Here, in the method for manufacturing a lithium-ion secondary battery negative electrode according to the present embodiment, control is performed such that B/A which is a ratio of the density B of the negative electrode layer formed in the second step to the density A of the negative electrode layer precursor formed in the first step is in a range of 0.9<B/A<1.4. Specifically, by selecting the types of materials, the amounts of materials, treatment conditions and the like, control is performed such that B/A (that is, a density increase ratio) which is the ratio of the density B of the negative electrode layer to the density A of the negative electrode layer precursor is within the range described above. In this way, the skeleton-forming agent used in the impregnation spreads into the inside of the negative electrode layer, with the result that the skeleton-forming agent is also arranged at the interface of the collector in the negative electrode layer. Hence, by the formation of the skeleton with the skeleton-forming agent arranged uniformly within the entire negative electrode layer, a high mechanical strength is obtained, and thus the cycle life characteristics are improved.

In the method for manufacturing a lithium-ion secondary battery negative electrode according to the present embodiment, the density A of the negative electrode layer precursor formed in the first step is set to 0.5 to 2.0 g/cm$^3$. In this way, B/A (that is, the density increase ratio) which is the ratio of the density B of the negative electrode layer to the density A of the negative electrode layer precursor can be more reliably set within the range described above, with the result that the effects of the skeleton-forming agent described above can be improved. The density A of the negative electrode layer precursor is more preferably in a range of 0.6 to 1.5 g/cm$^3$. The density A of the negative electrode layer precursor is set equal to or greater than 0.6 g/cm$^3$ so as to be able to suppress a decrease in energy density caused by a decrease in electrode density, and is set equal to or less than 1.5 g/cm$^3$ so as to be able to suppress a decrease in capacity.

A method for manufacturing a lithium-ion secondary battery positive electrode of the present invention includes applying on a collector a positive electrode material containing a positive electrode active material, a conductivity aid, and a binder, drying the positive electrode material, followed by rolling. For example, while a 10 μm thick rolled aluminum foil is manufactured and aluminum foil which has been wound in a roll shape in advance is prepared, as the positive electrode material, a positive electrode active material, a binder, a conductivity aid and the like are mixed together to prepare a paste-like slurry. Then, the slurry-like positive electrode material is applied to the surface of aluminum, dried, and then subjected to roll pressing to obtain a positive electrode. A foamed porous body made of metal may be used as a collector. This collector is characterized by being filled with an electrode material mixture. A method for filling a collector with an electrode material mixture is not particularly limited, and examples thereof include a method of filling an interior of a network structure of the collector with a slurry containing an electrode material mixture by pressurizing by an injection method. After filling the electrode material mixture, the filled collector is dried and subsequently pressed to improve the density of the electrode material mixture, and can be adjusted so as to have a desired density.

Finally, the negative electrode and the positive electrode obtained are cut to desired sizes, are joined through the separator and are sealed in a state where they are immersed in the electrolytic liquid, and thus it is possible to obtain the lithium-ion secondary battery. The structure of the lithium-ion secondary battery can be applied to the form or structure of an existing battery such as a laminated battery or a wound battery.

[Effects]

According to the present embodiment, the following effects are achieved. In the present embodiment, a non-aqueous electrolyte secondary battery negative electrode 1 including a collector 11 formed of a porous metal body and a negative electrode material 12 arranged in pores of the porous metal body is configured so that the negative electrode material 12 includes a negative electrode active material 13 formed of a silicon-based material, a skeleton-forming agent 14 containing a silicate having a siloxane bond, a conductivity aid 15, and a binder 16.

Firstly, by using a porous metal body as the collector 11, the negative electrode material 12 can be fixed in a micron size range by the porous metal skeleton, thereby being capable of suppressing the negative electrode from peeling and occurrence of cracking. Further, by using the skeleton-forming agent 14 as the negative electrode material 12, the negative electrode material 12 can be fixed in a nano-size range. More specifically, a third phase is formed by the skeleton-forming agent 14 at the interface between the collector 11 formed of a porous metal body and the negative electrode active material 13, the third phase firmly bonding the negative electrode active material 13 in the negative electrode material 12, thereby suppressing falling-off during expansion and contraction and a deterioration in durability. Therefore, by a double skeleton structure formed by filling the negative electrode material 12 containing such a skeleton-forming agent 14 into a foamed metal body, the structure of the negative electrode can be maintained even when cycles of a full charge-discharge having an SOC of 0 to 100 are performed, irrespective of the negative electrode active material 13 formed of a silicon-based material having a high capacity and an extremely large expansion and contraction rate being used. Additionally, it is possible to suppress falling-off or breakage of conductive path that occurs when a film thickness of the negative electrode is increased for a higher capacity or a high amount is applied to the negative electrode, thereby being able to achieve a high cycle performance and an overwhelming high energy density.

The present invention is not limited to the embodiment described above, and variations and modifications are included in the present invention as long as the object of the present invention can be achieved. For example, the non-aqueous electrolyte secondary battery which is a secondary battery (electricity storage device) using, as its electrolyte, a non-aqueous electrolyte such as an organic solvent includes, in addition to a lithium-ion secondary battery, a sodium-ion secondary battery, a potassium-ion secondary battery, a magnesium-ion secondary battery, a calcium-ion secondary battery and the like. The lithium-ion secondary battery means a non-aqueous electrolyte secondary battery whose main component is not water and a battery which includes lithium ions as a carrier responsible for electrical conductivity. For example, the lithium-ion secondary battery, a metal lithium battery, a lithium-polymer battery, a lithium all-solid-state battery, an air lithium-ion battery and the like are included. The same applies to other secondary batteries. Here, the non-aqueous-electrolyte whose main component is not water means that the main component in the electrolyte is not water. In other words, it is a known electrolyte used in the non-aqueous electrolyte secondary battery. This electrolyte can function as a secondary battery even when it includes a small amount of water but this adversely affects the cycle characteristics, the storage characteristics and input/output characteristics of the secondary battery, and thus an electrolyte in which water is minimized is desirable. The amount of water in the electrolyte is realistically preferably equal to or less than 5,000 ppm.

EXAMPLES

Although Examples of the present invention will now be described, the present invention is not limited to these Examples.

Example 1

[Manufacture of Negative Electrode]

A slurry which included silicon (particle size: 1 to 0.3 μm) serving as a negative electrode active material, a conductivity aid and polyvinylidene difluoride (PVdF) serving as a binder shown in Table 1 was prepared. Then, the prepared slurry was filled into "Nickel Celmet" (registered trademark) manufactured by Sumitomo Electric Industries, Ltd. serving as a collector and was dried, and thereafter pressure adjustment treatment was performed to obtain a negative electrode layer precursor.

On the other hand, as a skeleton-forming agent liquid including a skeleton-forming agent and water, an aqueous solution of 10% by mass of $Na_2O \cdot 3SiO_2$ was prepared. The negative electrode layer precursor prepared above was immersed in the prepared skeleton-forming agent liquid. Then, after the immersion, the precursor of the negative electrode was heated and dried at 160° C., and thus the negative electrode in which a negative electrode layer was formed was obtained.

[Preparation of Positive Electrode]

As a positive electrode active material, $LiNi_{0.5}Co_{0.2}Mn_{0.3}O_2$ (particle diameter: 5 to 15 μm) was prepared. 94% by mass of a positive electrode active material, 4% by mass of carbon black as the conductivity aid, and 2% by mass of polyvinylidene difluoride (PVdF) as the binder were mixed, and the obtained mixture was dispersed in an appropriate amount of N-methyl-2-pyrrolidone (NMP) to prepare a positive electrode material mixture slurry. As a collector, foamed aluminum with a thickness of 1.0 mm, a porosity of 95%, a cell number of 46 to 0.50 cells per inch, a pore size of 0.5 mm, and a specific surface area of 5,000 $m^2/m^3$ was prepared. The prepared positive electrode material mixture slurry was applied to the collector so as to have an application amount of 90 $mg/cm^2$ by an injection method. The collector was dried in a vacuum at 1.20° C. for 12 hours, and then roll pressed at a pressure of 15 tons, to manufacture a lithium-ion secondary battery positive electrode in which an electrode material mixture was filled in the pores of the aluminum foam.

[Manufacture of a Lithium-Ion Secondary Battery]

As a separator, a microporous film formed of a three-layered laminate of polypropylene/polyethylene/polypropylene having a thickness of 25 μm was prepared and punched into a size of 100 mm in length×90 mm in width. The lithium-ion secondary battery positive electrode and the lithium-ion secondary battery negative electrode obtained above were stacked in the order of positive electrode/separator/negative electrode/separator/positive electrode/separator/negative electrode to produce an electrode Laminate.

Thereafter, a tab lead was joined to a current-collecting region of each electrode by ultrasonic welding. The electrode laminate to which the tab lead was weld joined was inserted into a bag obtained by processing a secondary battery aluminum laminate into a bag shape by heat sealing, to produce a laminate cell. As an electrolytic solution, a solution in which 1.2 mol of $LiPF_6$ was dissolved in a solvent obtained by mixing ethylene carbonate, dimethyl carbonate, and ethyl methyl carbonate at a volume ratio of 3:4:3 was prepared, and the electrolytic solution was injected into the laminate cell described above to produce a lithium-ion secondary battery.

Comparative Example 1

A lithium-ion secondary battery was prepared in the same manner as in the Example, except that no skeleton-forming agent was used when preparing the negative electrode.

Comparative Example 2

A slurry containing silicon as the negative electrode active material, a conductivity aid shown in Table 1, and polyvinylidene difluoride (PVdF) as the binder was prepared. Then, the prepared slurry was applied to a copper foil as the collector, dried, and then subjected to a pressure adjustment treatment to obtain a negative electrode layer precursor.

On the other hand, as the skeleton-forming agent liquid including a skeleton-forming agent and water, an aqueous solution of 10% by mass of $Na_2O \cdot 3SiO_2$ was prepared. The precursor of the negative electrode obtained as described above was immersed in the prepared skeleton-forming agent liquid. Then, after the immersion, the precursor of the negative electrode was heated and dried at 160° C., and thus a negative electrode in which a negative electrode layer was formed was obtained.

Note that the positive electrode was prepared in the same manner as in Example 1, except that the application amount of Example 1 was changed to 45 $mg/cm^2$. Further, a battery was manufactured in the same manner as in Example 1.

[SEM Observation]

The negative electrode of Example 1 was subjected to machining with a cross section polisher and observed by SEM.

[Duration Test]

A cycle life test was performed on the Examples and Comparative Examples. The cycle life test was performed under conditions in which a test environment temperature was 25° C., a current density was 0.2 C-rate and a cutoff potential was 2.5 to 4.2 V.

TABLE 1

| | Collector | Skeleton-forming agent | Composition | Amount applied (mAh/cm$^2$) | Thickness (μm) | Coated amount (mg/cm$^2$) |
|---|---|---|---|---|---|---|
| Example 1 | Foamed metal body | $K_2O \cdot 3SiO_2$ | Si/AB/VGCF/PVdF = 90/4.2/0.8/5 Mass % | 30 | 150 | 1.39 |
| Comparative Example 1 | Foamed metal body | None | The same as above | 30 | 150 | None |
| Comparative Example 2 | Copper foil | $K_2O \cdot 3SiO_2$ | Si/AB/VGCF/PVdF = 90/4.2/0.8/5 Mass % | 15 | 70 | 0.6 |

TABLE 2

| | Cycle | Charging (mAh/g) | Discharging (mAh/g) | Efficiency | Maintained ratio |
|---|---|---|---|---|---|
| Example 1 | 1 | 3837 | 3233 | 84.3% | — |
| | 2 | 3336 | 3246 | 91.6% | 100.0% |
| | 3 | 3291 | 3238 | 96.1% | 100.6% |
| | 4 | 3262 | 3225 | 97.7% | 100.2% |
| | 5 | 3224 | 3208 | 98.4% | 99.6% |
| | 6 | 3227 | 3198 | 99.3% | 98.9% |
| | 7 | 3207 | 3186 | 98.7% | 98.4% |
| | 8 | 3193 | 3173 | 99.0% | 97.9% |
| | 9 | 3159 | 3154 | 99.1% | 97.3% |
| | 10 | 3170 | 3150 | 99.8% | 96.5% |

TABLE 3

| | Cycle | Charging (mAh/g) | Discharging (mAh/g) | Efficiency | Maintained ratio |
|---|---|---|---|---|---|
| Comparative Example 1 | 1 | 3666 | 412 | 11.2% | — |
| | 2 | 151 | 121 | 80.1% | 29.4% |
| | 3 | 87 | 45 | 51.7% | 10.9% |
| | 4 | 32 | 20 | 62.5% | 4.9% |
| | 5 | 2 | 1 | 60.0% | 0.3% |
| | 6 | 1 | 1 | 88.1% | 0.2% |

TABLE 4

| | Cycle | Charging (mAh/g) | Discharging (mAh/g) | Efficiency | Maintained ratio |
|---|---|---|---|---|---|
| Comparative Example 2 | 1 | 2989 | 2429 | 81.3% | — |
| | 2 | 2389 | 2322 | 97.2% | 95.6% |
| | 3 | 2276 | 2211 | 97.1% | 91.0% |
| | 4 | 1981 | 1712 | 86.4% | 70.5% |
| | 5 | 1645 | 1501 | 91.2% | 61.8% |
| | 6 | 1491 | 1456 | 97.7% | 59.9% |
| | 7 | 1401 | 1388 | 99.1% | 57.1% |
| | 8 | 1362 | 1327 | 97.4% | 54.6% |
| | 9 | 1256 | 1217 | 96.9% | 50.1% |
| | 10 | 1177 | 1139 | 96.8% | 46.9% |

Figure 2:
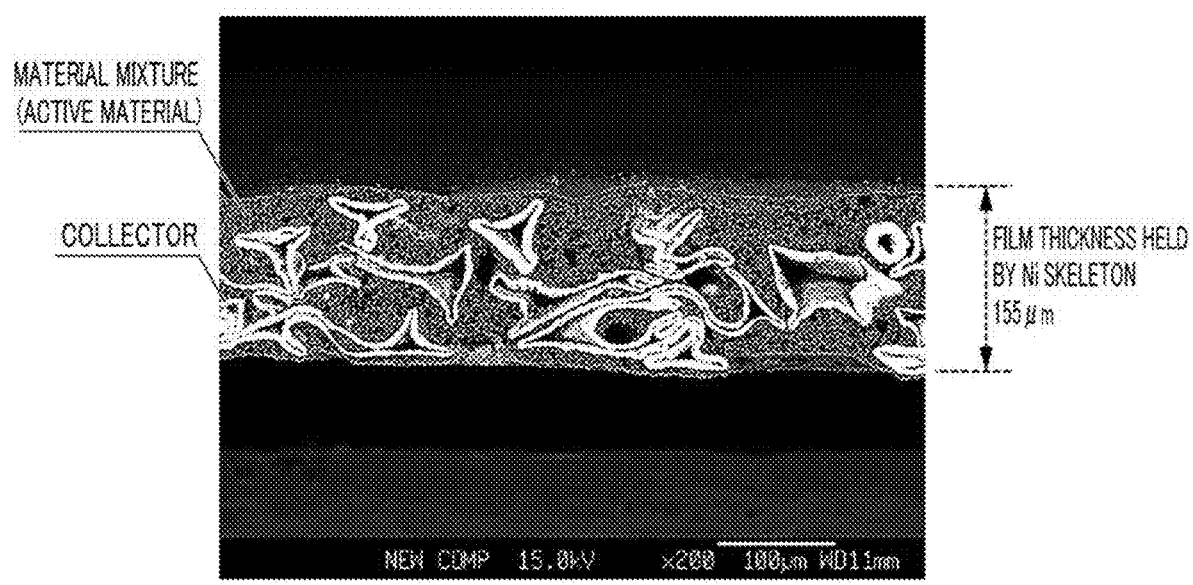
FIG. 2 is a cross-sectional SEM image of the non-aqueous electrolyte secondary battery negative electrode according to Example 1.
Figure 3:
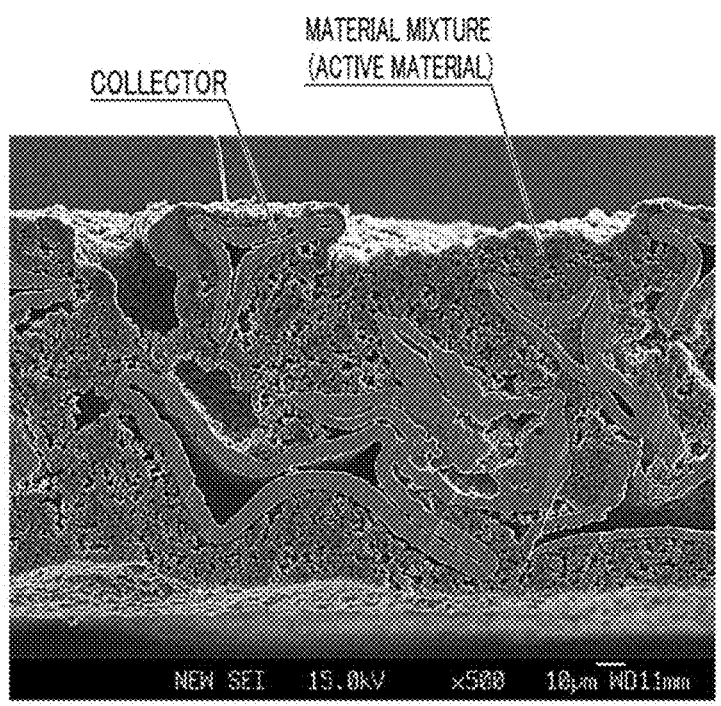
FIG. 3 is a cross-sectional SEM image of the non-aqueous electrolyte secondary battery negative electrode according to Example 1.

FIGS. 2 and 3 are cross-sectional SEM images of the non-aqueous electrolyte secondary battery negative electrode according to. Example 1. From FIG. 2, it was confirmed that the thickness of the non-aqueous electrolyte secondary battery negative electrode according to Example 1 was 155 μm. Further, from FIG. 3, it was confirmed that the distance between the collector formed of the porous metal body and the negative electrode active material was 50 μm or less.

Figure 4:
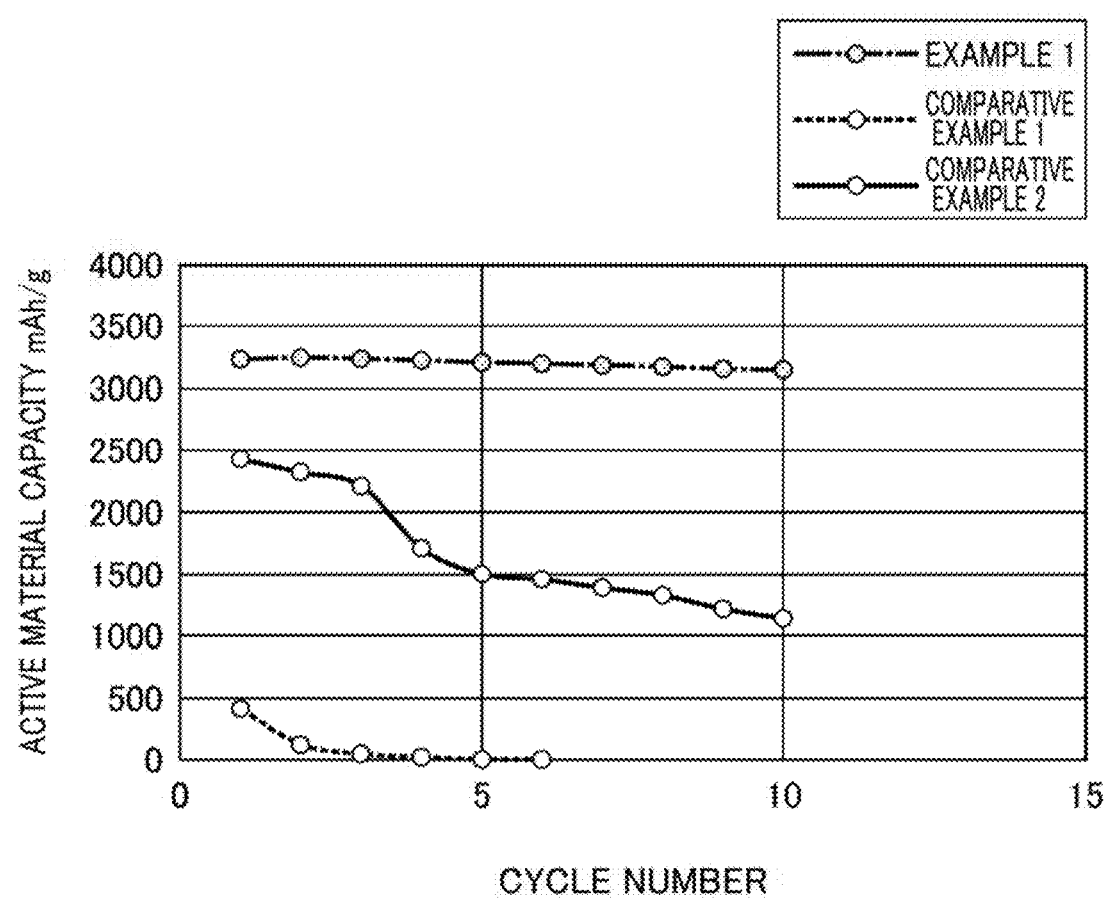
FIG. 4 is a diagram showing relationships between cycle numbers and discharge capacities of Example 1 and Comparative Examples 1 and 2.
Figure 5:
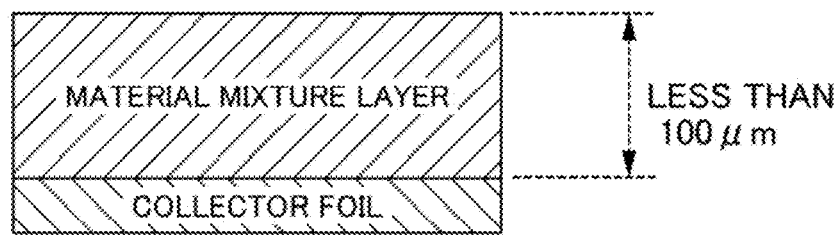
FIG. 5 is a diagram schematically showing a cross section of a conventional non-aqueous electrolyte secondary battery negative electrode.
Figure 6:
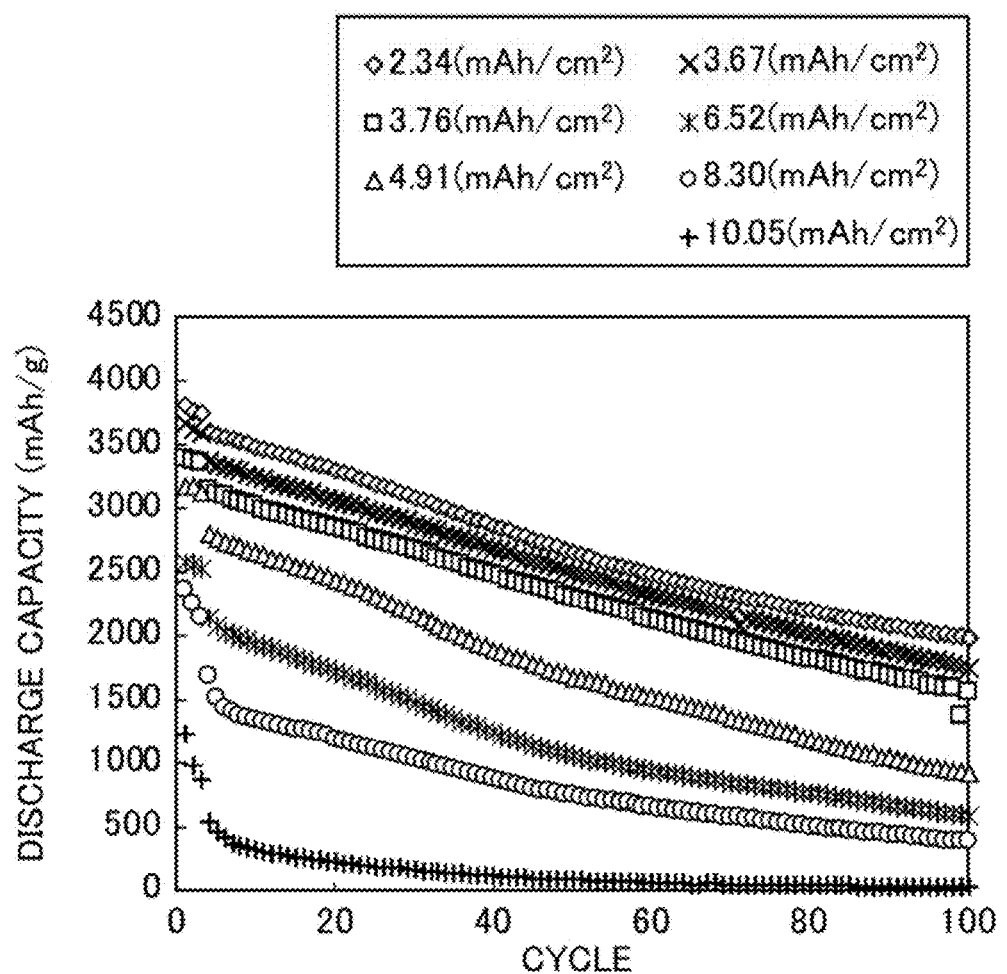
FIG. 6 is a diagram showing relationships between cycle numbers and discharge capacities when active material capacities in a conventional non-aqueous electrolyte secondary battery negative electrode are changed.

FIG. 4 is a diagram showing relationships between cycle numbers and discharge capacities in Example 1 and Comparative Examples 1 and 2. As is apparent from Tables 2 to 4 and FIG. 4, according to the present Example, it was confirmed that a non-aqueous electrolyte secondary battery negative electrode capable of suppressing a deterioration in durability and improving energy density and anon-aqueous electrolyte secondary battery containing the same were obtained.

EXPLANATION OF REFERENCE NUMERALS

1 Non-aqueous electrolyte secondary battery negative electrode
11 Collector
12 Negative electrode material
13 Negative electrode active material
14 Skeleton-forming agent
15 Conductivity aid
16 Binder

What is claimed is:

1. A non-aqueous electrolyte secondary battery negative electrode, comprising:
a collector formed of a foamed metal body formed of Ni or a Ni alloy, and a negative electrode material disposed in pores of the foamed metal body,
wherein the foamed metal body has an average pore diameter of 500 μm or less and a porosity of 90 to 99%.
wherein the negative electrode material is a cured product of a composition comprising a negative electrode active material formed of a silicon-based material, a skeleton-forming agent comprising a silicate represented by the following formula (1), a conductivity aid, and a binder, and when the total solid content of the negative electrode active material, the skeleton-forming agent, the conductivity aid, and the binder is assumed to be 100% by mass, the content of the skeleton-forming agent is 3.0 to 40.0% by mass,

[Chem. 1]

$$A_2O \cdot nSiO_2 \qquad \text{formula (1)}$$

wherein A represent K and n is 2.0 or more and 3.5 or less.

2. The non-aqueous electrolyte secondary battery negative electrode according to claim 1, wherein a thickness of the non-aqueous electrolyte secondary battery negative electrode is 50 μm to 1,000 μm.

3. The non-aqueous electrolyte secondary battery negative electrode according to claim 1, wherein a distance based on SEM observation between a porous surface of the foamed metal body and the negative electrode active material is 50 μm or less.

4. A non-aqueous electrolyte secondary battery comprising the non-aqueous electrolyte secondary battery negative electrode according to claim 1.

* * * * *